D. G. LITTLEFIELD.

2 Sheets—Sheet 1.

Stove.

No. 1,332.

Reissued Aug. 26, 1862.

WITNESSES

Franklin Scott

Marcus P. Norton

INVENTOR

Dennis G. Littlefield

N. PETERS, Photo-Lithographer, Washington, D. C.

2 Sheets—Sheet 2.

D. G. LITTLEFIELD.

Stove.

No. 1,332. Reissued Aug. 26, 1862.

Vertical Section

Horizontal Section

Front Elevation of the Stove

WITNESSES

Franklin Pratt.
Marcus P. Norton

INVENTOR

Dennis G. Littlefield

N. PETERS. Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,332, dated August 26, 1862.

DIVISION NO. 2.

*To all whom it may concern:*

Be it known that I, DENNIS G. LITTLEFIELD, of the city and county of Albany, State of New York, did, on or about the 24th day of January, 1854, obtain of and from the United States of America certain Letters Patent for and upon a new method of constructing that class of stoves using a supplying-cylinder for the reserve coal, which said patent was duly reissued in two separate divisions or patents, on the 19th day of November, 1861; and I do hereby declare that the following is a full and exact description of my invention, reference being had to the accompanying drawings and to the letters of reference marked thereon.

Like letters represent and refer to like or corresponding parts.

Figure 1:
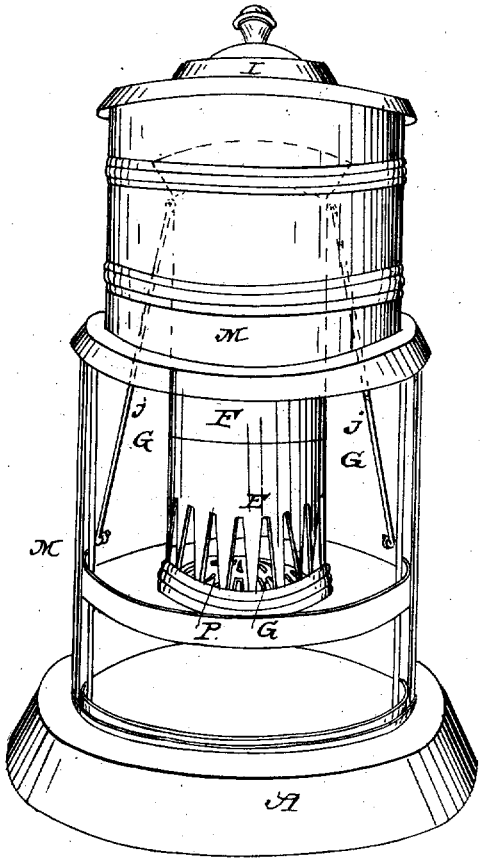
Figure 2:
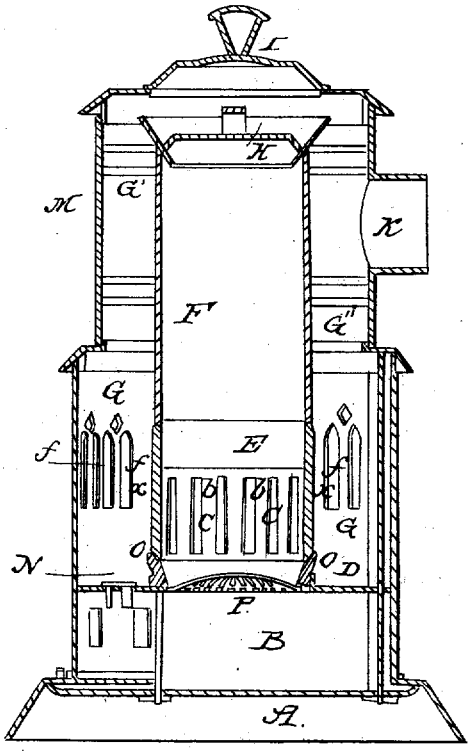
Figure 9:
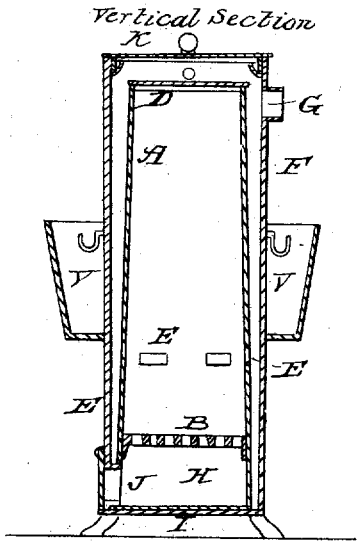
Figure 3:
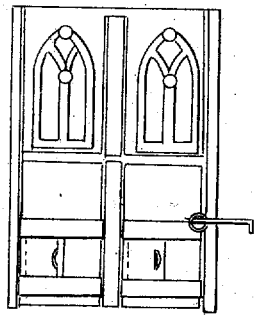
Figure 10:
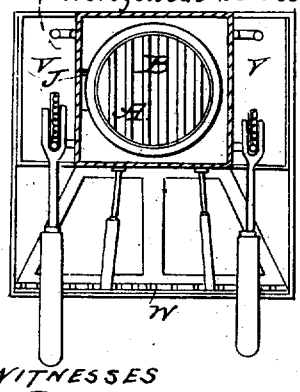
Figure 11:
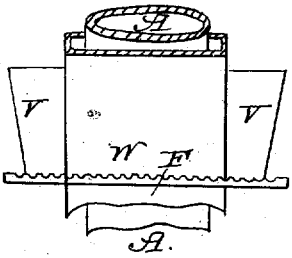

Figure 1 is a view of a cylinder-stove, a part of the outer cylinder being removed. Fig. 2 is a central vertical section of the same, and showing the illuminating exterior wall in combination with a coal-supply chamber and an intermediate gas-consuming chamber, hereinafter described and set forth.

The nature of my invention consists in the employment of an illuminated exterior wall or cylinder of any stove in connection with any opening or openings through the sides of the fire-cylinder of the fire-chamber or fire-pot, and an intermediate space or chamber wherein gas is consumed, and the operation of the same can be witnessed from without, at the same time giving light and a cheerful appearance through the said illuminating-wall to any room wherein this stove is used, as well as the benefit of a large amount of heat by direct radiation from the fire itself.

To enable others skilled in the art to make and use my invention, I will here proceed to describe its construction and operation, which is as follows, to wit:

M is the outer wall or cylinder of this stove, and may be of any convenient form or size. It is provided with a cover, I, at the top thereof, which is closely fitted thereon and thereto. It also contains a draft or exit pipe, K, for the passage of the smoke and spent gases (if any) out from the stove. It is also provided with openings *f* upon every side, if desirable, which openings are glazed with isinglass or any other transparent substance, and thus the stove when in operation presents the cheerful appearance of an open fire by the consuming gases within the said intermediate chamber, G. The said openings *f* may be constructed in any part of the said cylinder or exterior wall, M, desired, in order to carry out the purpose or object of the same, as aforesaid, and may be of any size or number desired. It is immaterial where the gas is consumed in the said intermediate chamber, G, from and by means of the fire-pot or any appendage thereof, for in any event the said openings *f* will be located in the said exterior wall, M, to correspond and carry out the purposes intended.

F is the coal supply chamber, and is firmly fastened to the upper end of the fire-pot E. This supply-chamber has a cover, H, fitted closely in the top thereof, so as to prevent the escape of gases or entrance of air therein.

Having thus described my invention, what I claim, and desire to secure by Letters Patent, is—

The illuminated exterior wall or cylinder, M, with openings *f* therein, glazed with isinglass or any transparent substance, or any equivalent therefor, in combination with a coal-supply chamber and an intermediate chamber, G, wherein gas is consumed at or around the fire-pot or any appendage thereof, substantially as and for the purpose herein described and set forth.

DENNIS G. LITTLEFIELD.

Witnesses:

JAMES B. SANDERS,

A. V. DE WITT.